(12) United States Patent
Hong et al.

(10) Patent No.: US 7,508,587 B2
(45) Date of Patent: Mar. 24, 2009

(54) LASER LEVEL

(75) Inventors: Fang Zhi Hong, Hang-zhou (CN); Chen Ye, Hang-zhou (CN); Chen Yue Ye, Hang-zhou (CN); Liu Hua Tang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 796 days.

(21) Appl. No.: 11/028,565

(22) Filed: Jan. 5, 2005

(65) Prior Publication Data

US 2005/0252014 A1 Nov. 17, 2005

(30) Foreign Application Priority Data

May 12, 2004 (TW) ................................ 93113277 A

(51) Int. Cl.
*G02B 27/10* (2006.01)
*G02B 13/20* (2006.01)
*G01C 5/00* (2006.01)

(52) U.S. Cl. ...................................... 359/618; 359/707

(58) Field of Classification Search ................. 359/618, 359/636, 719, 811, 707, 637–640; 33/290–292
See application file for complete search history.

(56) References Cited

U.S. PATENT DOCUMENTS

2002/0138997 A1* 10/2002 Ohtomo et al. ............... 33/290

* cited by examiner

*Primary Examiner*—Alicia M Harrington

(57) ABSTRACT

An optical system for a laser level is described. The laser level includes at least two optical systems which are parallel to and oppositely adjoin to each other in a same plane. Each optical system includes a laser light source, a regular lens, a diffusion lens, a beam-splitting element, and an outer casing as well as the regular lens and the diffusion lens are located between the laser light source and the beam-splitting element. For the optical system of the laser level, the laser beam is sequentially regularized, diffused and split into a fan-shaped light beam with an angle greater than 180 degrees to ensure that the light beams from the optical systems are spread in the same plane. Thus, the laser level generates a disk-shaped light beam with 360 degrees to indicate a circular mark in the same plane.

20 Claims, 4 Drawing Sheets

LASER LEVEL

FIELD OF THE INVENTION

The present invention generally relates to a laser level, and more particularly, to a laser level, which includes at least two optical systems located side by side, to spread beam emitted from the optical systems in the same plane.

BACKGROUND OF THE INVENTION

In the construction industry, it is difficult to determine distant horizontal or vertical lines on the walls by a reference line, especially to draw desired lines at different walls. Conventional methods for carrying out the line-drawing or line-determination operation can be performed by utilizing rulers, ink-string boxes, levelers as are well-known in the art. However, the conventional methods may be tedious and difficult to achieve accuracy at operation, and man-made errors occur.

The datum horizontal indication performed by the level includes the type of beam-directed or beam-rotated emission in the prior art. The beam-directed emission diffuses the laser beam to profile a line-shaped using a cylindrical lens along a horizontal direction so that the laser beam is projected on the surface of the desired object. The disadvantage of the beam-directed emission is that the emission angle of the light beam is severely restricted within a small range after the laser beam is sent out. In other words, the length of the line-shaped is decreased. For the indication of a longer datum line or circular plane with 360 degrees on the objects in a specific application, it is necessary to perform many indication steps or combine a plurality of lenses. As a result, the above-mentioned method is not easy to be operated and subject to a complex assembly of the lenses.

In the type of beam-rotated emission, a dot-shaped emitted by laser facula forms a horizontal fan covering at a high-speed rotation. Due to the persistance of vision, the dot-shaped profile is projected on the distant vertical plane to generate a line of the laser facula. The disadvantage is that the vibration of the structure of the beam-rotated emission degrades the precision of the level due to rotation of the beam. Additionally, the power consumption of the rotational mechanism may increase the manufacturing cost and the size of the level.

For another type of level in the prior art, a laser level is composed of four identical optical systems implemented by the beam-directed emission. Each optical system is disposed to form an included angle with 90 degrees in a horizontal plane. Each optical system includes a laser diode, a regular lens and a cylindrical lens. The beam of light is generated from the laser diode and delivered through the regular and the cylindrical lens to form a light emission having a diffusion angle greater than 90 degrees in the horizontal plane. By adjusting the position and the inclination angle of each optical system, all the light emissions are integrated into a light beam with 360 degrees. However, such a structure uses four laser diodes and the four set of optical systems results in increment of manufacturing cost. Further, it is necessary to carefully calibrate the optical systems and the assembly difficulty and complexity of the level will considerably decrease the production efficiency.

In addition, U.S. patent application Ser. No. 10/838,348 discloses a laser level filed on May 5, 2004. The laser level utilizes two optical systems with beam-directed emission to form a beam-split element and the two optical systems are disposed at a position of 180 degrees in a horizontal plane. Each of the optical systems comprises a laser diode, beam-split element two sets of regular and cylindrical lens which are perpendicular to each other. The light beam emitted from the laser diode is delivered through the beam-split element, regular lens and the cylindrical lens to form two perpendicular light emissions having a diffusion angle greater than 90 degrees in the horizontal plane. By adjusting the position and the inclination angle of each optical system, all the light emissions are integrated into a light beam with 360 degrees. However, although the level has two optical systems, four sets of regular lenses and cylindrical lenses are installed in the laser level, thereby resulting in high manufacturing cost and complex assembly, which is disadvantageous to the production efficiency of the level.

Consequently, there is a need to develop a laser level to transfer the light emitted from a laser diode into a circular plane with 360 degrees to reduce the manufacturing cost and the size of the laser level.

SUMMARY OF THE INVENTION

One object of the present invention is to provide a laser level including at least two optical systems to spread the beam emitted therefrom in the same plane.

The laser level comprises at least two optical systems which are parallel to and oppositely adjoins to each other in a same plane, such as a horizontal plane. Each optical system comprises a laser light source, a regular lens, a diffusion lens, a beam-splitting element, and an outer casing as well as the regular lens and the diffusion lens are located between the laser light source and the beam-splitting element.

In one embodiment of the optical system for a laser level of the present invention, the regular lens and the diffusion lens are aligned sequentially from the laser light source to the beam-splitting element along an optical axis. The regular lens is a positive lens. The diffusion lens is an aspheric cylindrical lens. The optical system further comprises a body tube to coaxially align the laser diode and the regular lens therein to form a collimated light.

The laser level in the present invention does not use a rotational mechanism to rotate the optical systems such that it achieves great precision and stability accordingly. For the optical system applied to the laser level, the laser beam is sequentially regularized, diffused and split into a fan-shaped light beam with an angle greater than 180 degrees to ensure that the light beams from the optical systems are spread in the same plane to avoid additional calibration of the laser level. In addition, the two optical systems are able to generate a disk-shaped light beam with 360 degrees to indicate a circular mark in the same plane. The optical system advantageously has a laser diode, a regular lens, a diffusion lens and a beam-splitting lens. As a result, the present invention is beneficial to save additional components and manufacturing cost as well as results in size-reduced, simplified calibration and rapid assembly to increase the production efficiency.

BRIEF DESCRIPTION OF THE DRAWINGS

The foregoing aspects and many of the attendant advantages of this invention will become more readily appreciated as the same becomes better understood by reference to the following detailed description when taken in conjunction with the accompanying drawings, wherein.

DETAILED DESCRIPTION OF THE PREFERRED EMBODIMENTS

Figure 1:
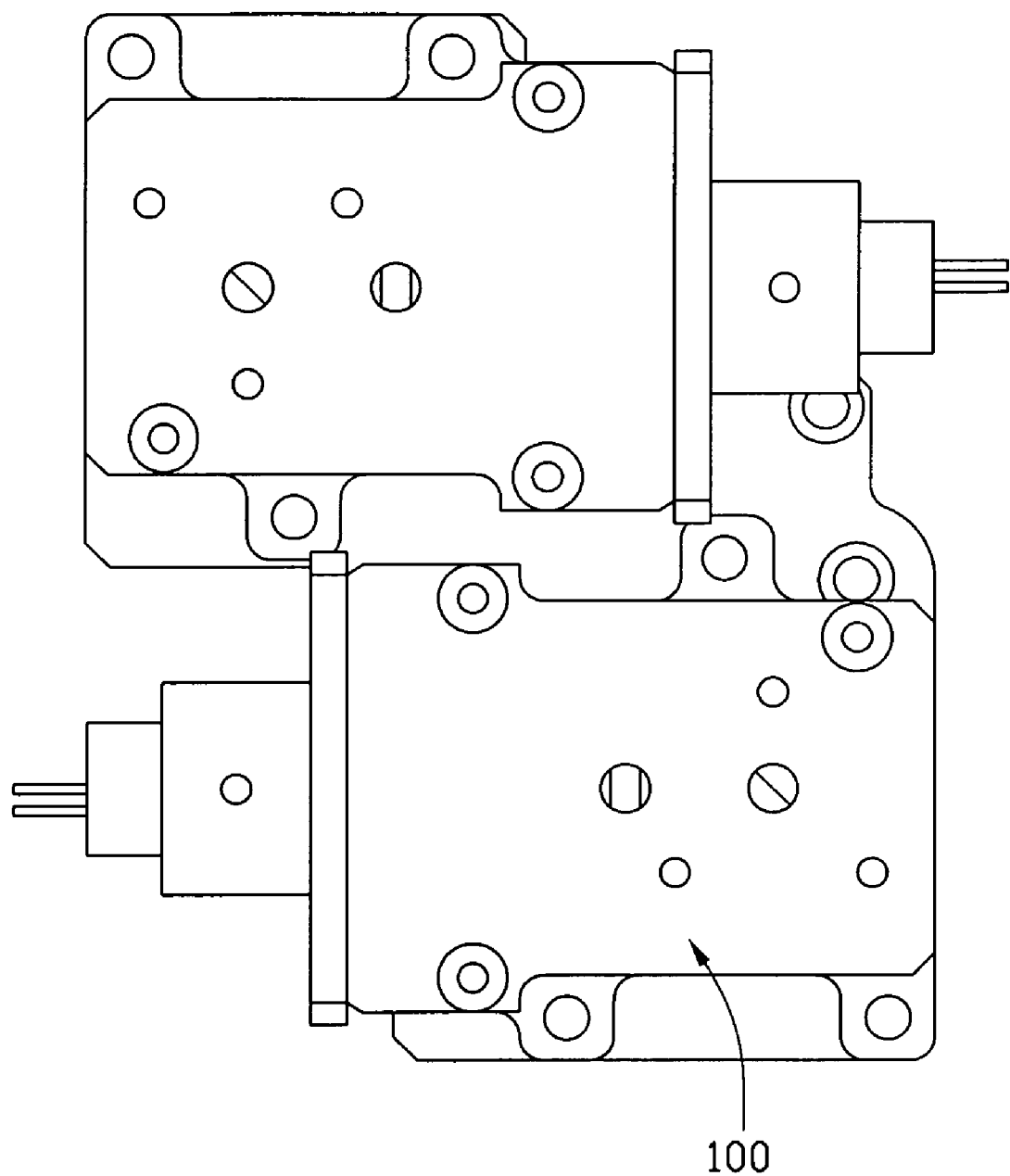
FIG. 1 is a top view of a laser level according to the present invention.

Referring to FIG. 1, a top view of a laser level according to the present invention is shown. The laser level includes at least two optical systems to spread the beam emitted therefrom in the same plane. Only one optical system is described as an example since the operation principle and components of the optical systems are substantially same.

Figure 2:
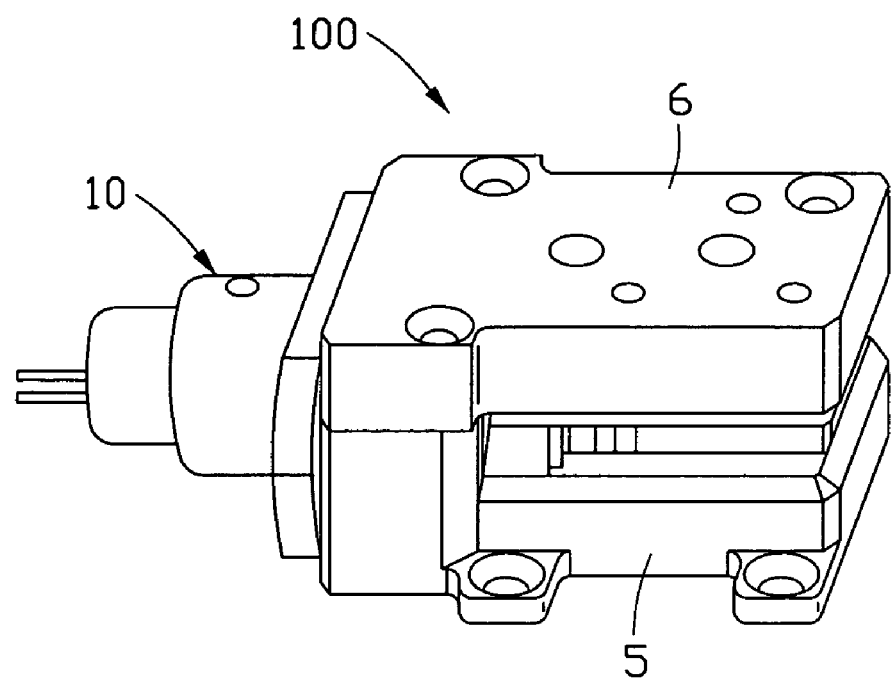
FIG. 2 is a three-dimensional view of an optical system of the laser level according to the present invention.
Figure 3:
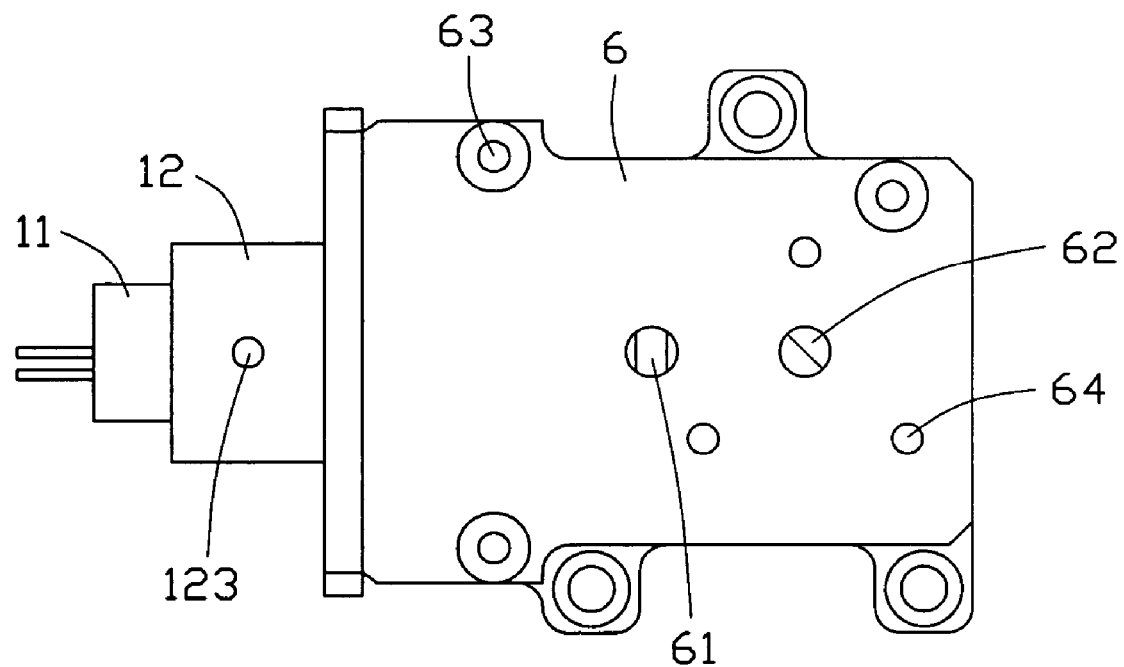
FIG. 3 is a top view of the optical system in FIG. 2 according to the present invention.
Figure 4:
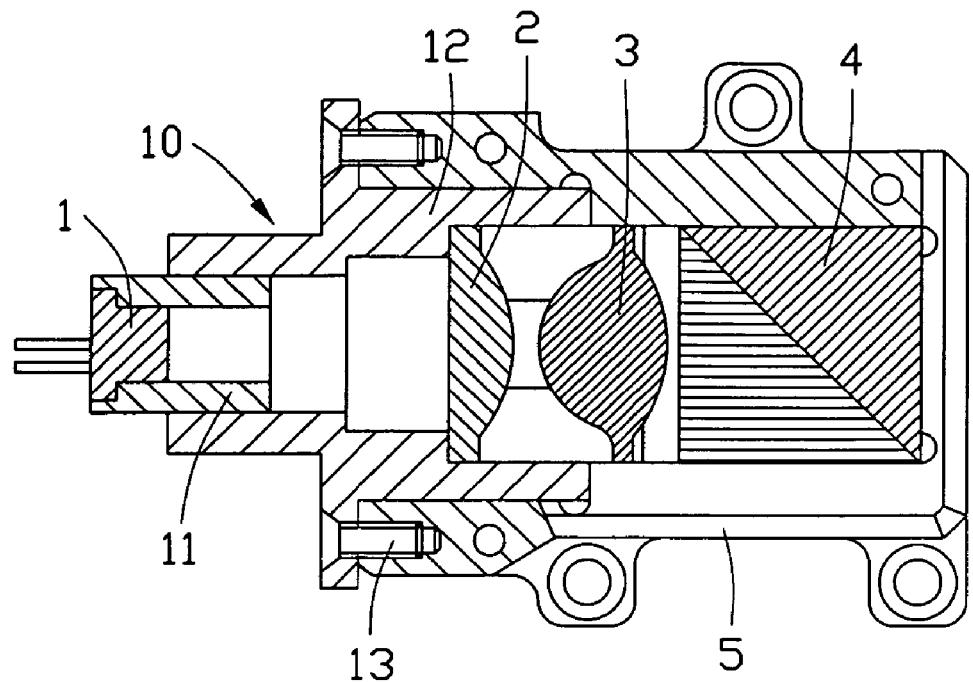
FIG. 4 is a cross-section view of the optical system in FIG. 2 along a horizontal direction according to the present invention.
Figure 5:
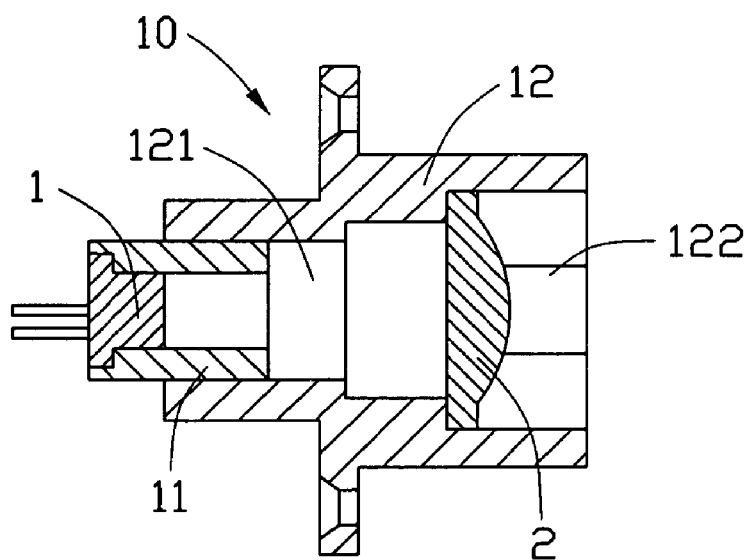
FIG. 5 is a cross-section view of a light source module of the optical system in FIG. 2 according to the present invention.
Figure 6:
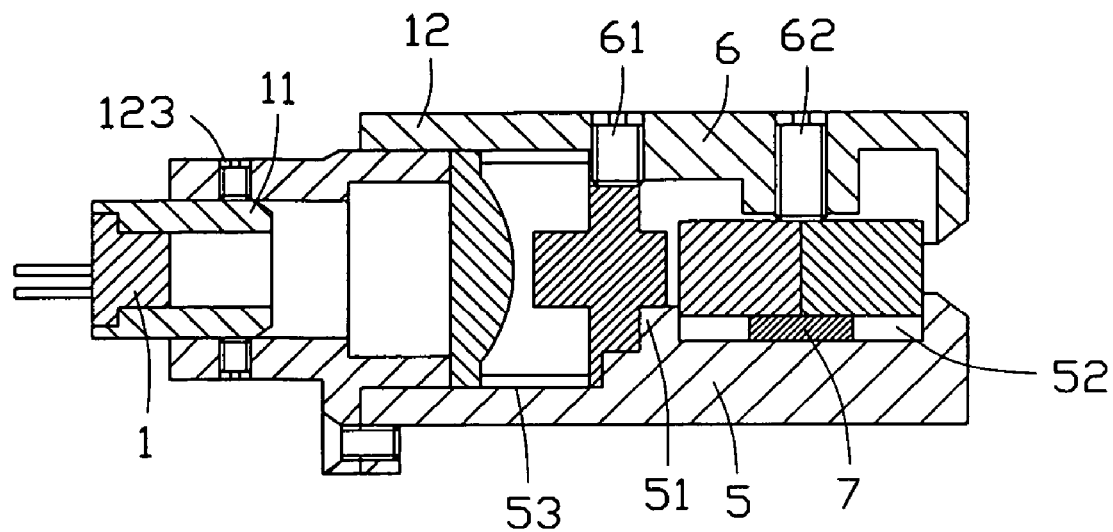
FIG. 6 is a cross-section view of the optical system in FIG. 2 along a vertical direction according to the present invention.

Referring to FIG. 1 to FIG. 6, the laser level comprises a laser light source 1, a regular lens 2, a diffusion lens 3, a beam-splitting element 4, and an outer casing having a lower cover 5 and an upper cover 6 for containing above-mentioned components or units. In one embodiment of the present invention, the regular lens 2 is a positive lens, the diffusion lens 3 is an aspheric cylindrical lens and the beam-splitting element 4 comprises a beam-splitting prism or the like. The laser diode 1 and the regular lens 2 are positioned in a body tube and serve as a light source module 10 to form a collimated light. As shown in FIG. 3, FIG. 4 and FIG. 5, the light source module 10 has a first tube 11 and a second tube 12. The laser diode 1 is set up in one end portion of the first tube 11. The second tube 12 has a first aperture 121 and a second aperture 122, and their sizes are different. The first aperture 121 and the second aperture 122 are coaxially aligned. The size of the first aperture 121 is matched with the outer diameter of the first tube 11 and the first tube 11 can be adjusted by changing the position of the first tube 11 within the first aperture 121. The size of the second aperture 122 is also matched with the regular lens 2 to contain the regular lens 2. At least one fastening screw 123 is embedded in the sidewall of the first aperture 121 of the second tube 12. The first tube 11 contained in first aperture 121 can be moved back and forth to adjust the distance between the laser diode 1 and regular lens 2 to change the focal length of the regular lens 2 on the laser diode 1. In addition, the first tube 11 is secured by the fastening screws 123. The light source module 10 is used to increase the collimated precision and accurately adjust the focal length between the laser diode 1 and regular lens 2.

Referring to FIG. 2, FIG. 3, FIG. 4, FIG. 6, one end portion of the lower cover 5 of the optical system 100 has a chamber 53 to contain the light source module 10. The position adjacent to the chamber 53 has a first base portion 51 and a second base portion 52 to be installed with the diffusion lens 3 and the beam-splitting element 4, respectively. The locations of the upper cover 6 corresponding to the first base portion 51 and the second base portion 52 of the lower cover 5 include at least one fastening screws (61, 62) and a plurality of adjusting screws 64 located around the fastening screw 62. The light source 10 is located under the chamber 53 of the lower cover 5 and fastened with a fastening device 13, such as a bolt. The diffusion lens 3 and beam-splitting element 4 are located in the first base portion 51 and the second base portion 52, respectively. Further, an elastic device 7, such as rubber pad, is disposed under the beam-splitting element 4 to provide the beam-splitting element 4 with an adjustable distance at a vertical direction perpendicular to the optical axis of the optical system 100. The upper cover 6 is assembled with the lower cover 5 by a fastening device 63, such as a bolt or the like, to form an outer casing of the optical system 100. An optical path through the sidewall of the outer casing is provided for the light emission along the spectro-direction of the beam-splitting element 4. The fastening screws (61, 62) are screwed into the upper cover 6 to secure the diffusion lens 3 and beam-splitting element 4 between the lower cover 5 and the upper cover 6. The position of the first tube 11 within the second tube 12 can be finely changed to adjust the focal length of the light emission into a specific distance and then the first tube 11 is fastened. The distance is a range between 0 and 100 meters, or preferably a range between 5 and 20 meters. The collimated precision of the reflection plane of the beam-splitting element 4 can be modified using the adjusting screws 64 embedded in the upper cover 6 so that the reflective light through the beam-splitting element 4 is emitted at a uniform direction, such as a horizontal direction. Thus, the assembly and calibration of the optical system are complete.

Figure 7:
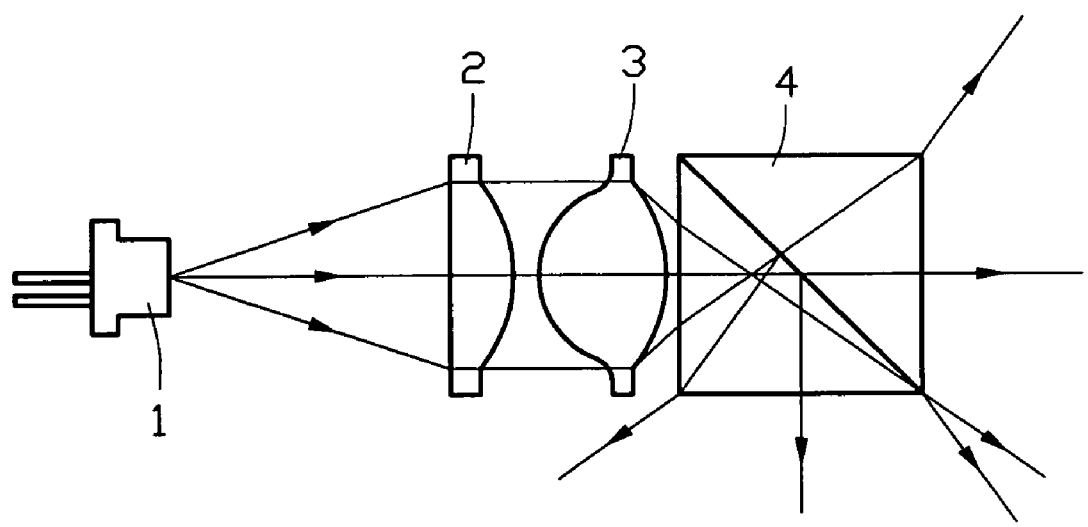
FIG. 7 is an optical path of the optical system in FIG. 2 according to the present invention.

FIG. 7 illustrates an optical path view of the optical system in FIG. 2 according to the present invention. The beam emitted from the laser diode 1 passes through the regular lens 2 to form a light beam. The diffusion lens 3, such as aspheric lens, diffuses the light beam from the regular lens 2 to the beam-splitting element 4 to generate a beam with a diffusing angle which ranges between 0 degree and 100 degrees. The beam-splitting element 4 reflects and refracts the light beam so that the two light beams from the reflection and the refraction are mutually perpendicular. Further, each light beam has a diffusing angle more than 90 degrees to be integrated into a light emission with other diffusing angle more than 180 degrees.

As shown in FIG. 1, by placing the optical systems which are parallel to and oppositely adjoins to each other, the laser level is able to spread the beam emitted in the same plane.

The laser level in the present invention does not use a rotational mechanism to rotate the optical systems such that it is able to increase the precision and the stability accordingly. For the laser level, the laser beam is sequentially regularized, diffused and split into fan-shaped light beam having an angle greater than 180 degrees to ensure that the light beams from the optical systems are spread in the same plane to avoid additional calibration of the laser level. In addition, the laser level is able to generate a disk-shaped light beam with 360 degrees to indicate circular mark in a horizontal plane. The optical system advantageously has a laser diode, a regular lens, a diffusion lens and a beam-splitting lens. Thus, the present invention is beneficial to economize on components and manufacturing cost as well as results in size-reduced, simplified calibration and rapid assembly to increase the production efficiency.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A laser level, comprising:
at least two optical systems which are parallel to and oppositely adjoin to each other in a same plane, the optical system comprising:
a laser light source for emitting a laser beam;

a regular lens adjacent to the laser light source and disposed along an emission direction of the laser beam from the laser light source;

a diffusion lens adjacent to the regular lens and disposed along the emission direction of the laser beam from the regular lens;

a beam-splitting element adjacent to the diffusion lens and disposed along the emission direction of the laser beam from the diffusion lens, wherein the diffusion lens diffuses the laser beam from the regular lens to the beam-splitting element to be diffused and split into fan-shaped light beam in the same plane; and an outer casing having a chamber to stably contain the laser light source, the regular lens, the diffusion lens and the beam-splitting element.

2. The laser level of claim 1, wherein the regular lens is a positive lens.

3. The laser level of claim 2, wherein the diffusion lens is an aspheric cylindrical lens.

4. The laser level of claim 3, wherein the optical system further comprises a body tube to coaxially align the laser light source and the regular lens therein to form a collimated light.

5. The laser level of claim 1, wherein the optical system further comprises a body tube to coaxially align the laser diode and the regular lens therein to form a collimated light.

6. The laser level of claim 5, wherein the body tube comprises a first tube and a second tube and the laser light source is located in the first tube.

7. The laser level of claim 6, wherein the second tube has a first aperture and a second aperture whose sizes are different, and the first aperture is aligned to the second aperture for moving the first tube located within the first aperture to adjust the position of the first tube.

8. The laser level of claim 7, wherein a sidewall of the first aperture of the second tube comprises a fastening screw to secure the first tube.

9. The laser level of claim 8, wherein the outer casing comprises an upper cover and a lower cover having a chamber, and a first base portion and a second base portion of the lower cover are used to receive and locate the diffusion lens and the beam-splitting element, respectively.

10. The laser level of claim 9, wherein the upper cover corresponding to the first base portion and the second base portion of the lower cover comprises at least one fastening screw.

11. The laser level of claim 10, wherein the upper cover corresponding to the second base portion of the lower cover comprises at least one fastening screw.

12. The laser level of claim 11, wherein the second base portion of the lower cover under the beam-splitting element further comprises a rubber pad.

13. A laser level, comprising:

at least two optical systems which are parallel to and oppositely adjoin to each other in a same plane, wherein each optical system comprises a laser light source, a regular lens, a diffusion lens, a beam-splitting element and an outer casing as well as the regular lens and the diffusion lens are located between the laser light source and the beam-splitting element, wherein the diffusion lens diffuses a laser beam of the laser light source from the regular lens to the beam-splitting element to be diffused and split into fan-shaped light beam in the same plane.

14. The laser level of claim 13, wherein the regular lens and the diffusion lens of the optical system are coaxially aligned and sequentially arranged from the laser light source to the beam-splitting element.

15. The laser level of claim 14, wherein the diffusion lens is an aspheric cylindrical lens.

16. The laser level of claim 13, wherein the optical system further comprises a body tube to coaxially align the laser light source and the regular lens therein to form a collimated light.

17. The laser level of claim 13, wherein the optical system further comprises a body tube to coaxially align the laser light source and the regular lens therein to form a collimated light.

18. The laser level of claim 17, wherein the body tube comprises a first tube and a second tube and the laser light source is located in the first tube.

19. The laser level of claim 18, wherein the second tube has a first aperture and a second aperture whose sizes are different, and the first aperture is aligned to the second aperture for moving the first tube located within the first aperture to adjust the position of the first tube.

20. The laser level of claim 19, wherein a sidewall of the first aperture of the second tube comprises a fastening screw to secure the first tube.

* * * * *